United States Patent
Chanut et al.

(10) Patent No.: US 7,641,731 B2
(45) Date of Patent: Jan. 5, 2010

(54) ULTRAHIGH-PERFORMANCE, SELF-COMPACTING CONCRETE, PREPARATION METHOD THEREOF AND USE OF SAME

(75) Inventors: Sandrine Chanut, Paris (FR); Thierry Thibaux, Nogent-sur-Marne (FR)

(73) Assignee: Eiffage TP, Neuilly-sur-Marne (FR)

( * ) Notice: Subject to any disclaimer, the term of this patent is extended or adjusted under 35 U.S.C. 154(b) by 307 days.

(21) Appl. No.: 10/589,138

(22) PCT Filed: Feb. 11, 2005

(86) PCT No.: PCT/FR2005/000334

§ 371 (c)(1), (2), (4) Date: Aug. 11, 2006

(87) PCT Pub. No.: WO2005/077857

PCT Pub. Date: Aug. 25, 2005

(65) Prior Publication Data

US 2007/0163470 A1    Jul. 19, 2007

(30) Foreign Application Priority Data

Feb. 13, 2004    (FR) ................... 04 01492

(51) Int. Cl.
*C04B 14/06* (2006.01)
(52) U.S. Cl. ............. 106/644; 106/713; 106/724; 106/737; 106/738; 106/823
(58) Field of Classification Search ........... 106/644, 106/713, 724, 823, 737, 738
See application file for complete search history.

(56) References Cited

U.S. PATENT DOCUMENTS

| | | | |
|---|---|---|---|
| 4,588,443 A | 5/1986 | Bache | 106/97 |
| 6,080,234 A * | 6/2000 | Clavaud et al. | 106/644 |
| 6,402,831 B1 | 6/2002 | Sawara et al. | 106/738 |
| 6,478,867 B1 * | 11/2002 | Cheyrezy et al. | 106/644 |
| 6,723,162 B1 * | 4/2004 | Cheyrezy et al. | 106/644 |
| 6,881,256 B2 * | 4/2005 | Orange et al. | 106/644 |
| 2003/0150364 A1 * | 8/2003 | Orange et al. | 106/802 |

FOREIGN PATENT DOCUMENTS

| | | | |
|---|---|---|---|
| EP | 0 934 915 B1 | 8/1999 | |
| JP | 2000-211956 | 8/2000 | |
| WO | WO 90/13524 | 11/1990 | |
| WO | WO 93/21122 | 10/1993 | |
| WO | WO 01/51427 A2 | 7/2001 | |

OTHER PUBLICATIONS

Derwent Abstract: FR 2813074 (Feb. 22, 2002) Casabonne et al. (abstract only).*
Elkem Materials Product Specification, [online] Dec. 2002, XP002347563. Retrieved from the Internet: URL:http://www.refractories.elkem.com/hits/web_0006.nsf/Files/Product-Datasheets-Refractories-MS/$file/Elkem_Microsilica_Grade_983. pdf>[retrieved on Sep. 30, 2005].
Elkem Materials Product Specification, [online] Feb. 2002, XP002347564. Retrieved from the Internet: URL:http://www.refractories.elkem.com/hits/web_0006.nsf/Files/Product-Datasheets-Refractories-MS/$file/Elkem_Microsilica_Grade_940. pdf>[retrieved on Sep. 30, 2005].
"White Concrete for Aggressive Environment" [Online] Sep. 2003, XP002347565 Retrieved from the Internet: URL:http://www.aalborgwhite.com/media/into_agressive_environment. pdf>[retrieved on Sep. 30, 2008] Synopsis, Contents, Appendix J.

* cited by examiner

*Primary Examiner*—Paul Marcantoni
(74) *Attorney, Agent, or Firm*—Occhiuti Rohlicek & Tsao LLP

(57) ABSTRACT

The invention relates to an ultra-high-performance, self-compacting light-colored concrete comprising: a cement; a mixture of calcined bauxite sands of different grain sizes, the finest sand having an average grain size of less than 1 mm and the thickest sand having an average grain size of less than 10 mm; optionally silica fume, whereby 90% of the particles thereof have a size of less than 1 ?m and the average diameter is approximately 0.5 ?m, said silica fume representing at most 15 parts by weight per 100 parts of cement; an antifoaming agent; water-reducing superplasticiser; optionally fibers; and water. The inventive concrete also comprises: ultrafine calcium carbonate particles having a specific surface area that is equal to or greater than 10 m$^2$/g and a form factor (IF) that is equal to or greater than 0.3 and, preferably, equal to or greater than 0.4. The grain size distribution of the cements, sands, ultrafine calcium carbonate particles and silica fume is such that at least three, and at most five, different grain size ranges are present, the ratio between the average diameter of one grain size range and that of the range immediately above is approximately 10. The invention also relates to the method of preparing one such concrete and to the uses thereof.

17 Claims, No Drawings

ULTRAHIGH-PERFORMANCE, SELF-COMPACTING CONCRETE, PREPARATION METHOD THEREOF AND USE OF SAME

CROSS-REFERENCE TO RELATED APPLICATIONS

This application is the National Stage of International Application No. PCT/FR2005/000334, filed on Feb. 11, 2005, which claims the benefit of French Application Serial No. 0401492, filed on Feb. 13, 2004. The contents of both of the foregoing applications are hereby incorporated by reference in their entirety.

The subject of the present invention is an ultrahigh-performance, self-compacting and non-heat-treated concrete and method of preparation and the uses of this concrete.

In the present invention, the term "concrete" is understood to mean a body of cementitious matrix which may, depending on the constructions to be formed, include fibers and is obtained by the hardening of a cementitious composition mixed with water.

In the present invention, the term "ultrahigh-performance concrete" is understood to mean a concrete having a characteristic 28-day compressive strength of 150 MPa or higher, this value being given for a concrete that has been preserved and maintained at 20° C. and has not undergone a cure or heat treatment.

In the present invention, the term "self-compacting concrete" is understood to mean a concrete that is very fluid, homogeneous and stable, and processed without vibration.

Ultrahigh-performance concretes are known to those skilled in the art.

Thus, European patent application EP 0 934 915 A1 describes a self-leveling, very high-performance concrete, containing in particular cement, a mixture of calcined bauxite sands of various particle sizes, silica fume, admixtures, such as a defoamer and a water-reducing super plasticizer, optionally fibers, and water. Such concretes have high mechanical properties, in particular a 28-day characteristic compressive strength of at least 150 MPa, a 28-day elastic modulus of at least 60 GPa and a 50-hour compressive strength of at least 100 MPa, these values being given for a concrete preserved and maintained at 20° C.

However, despite the useful performance in terms of mechanical properties, these concretes generally have a gray tint, owing to the presence of silica fume in their composition. Now, a gray tint is not always desirable, especially in certain applications such as, for example, architectonic concrete for which light, or even almost white, color is desirable.

At the present time there therefore still remains a need to have light-colored concrete that also has good mechanical properties.

The Applicant has succeeded in developing a light-colored ultrahigh-performance concrete by replacing the silica fume with ultrafine calcium carbonate particles having a specific surface area of at least 10 m$^2$/g and an form factor FF of at least 0.3, preferably 0.4.

The term "aspect ratio or AR" of an ensemble of particles is understood, for the purpose of the present invention, to mean the ratio of the sum of the thicknesses $\Sigma E$ of the particles (E being the thickness of a particle) to the sum of the lengths $\Sigma L$ of these same particles (L being the length of a particle), in a specimen of several hundred particles. The form factor FF is defined by the equation FF=$\Sigma E/\Sigma L$.

Given that the mean diameter of the ultrafine calcium carbonate particles is around 70 nm, the form factor will be determined by observing the particles and measuring their dimensions using a field-effect scanning electron microscope (SEM). The procedure is as follows:

samples are taken from a manufacturing batch of ultrafine calcium carbonate particles, each sample comprising about 100 particles;

the specimens are prepared for SEM examination by metallizing the particles and then attaching the metallized particles to the sample holder;

the samples are examined under the SEM;

the smallest and largest dimensions of each particle are measured using the microscope stage, the smallest dimension constituting the thickness E of the particle and the largest dimension constituting the length L of this particle, and the form factor FF is calculated for each sample; and the mean form factor is calculated by averaging over all the samples examined.

The form factor FF of an ensemble of spherical particles is equal to 1 while that of an ensemble of cubic particles is about 0.58.

The mean "diameter" of a particle denotes the diameter of the smallest sphere that can be included within said particle.

One subject of the present invention is therefore an ultrahigh-performance self-compacting concrete, comprising:

a cement;

a mixture of calcined bauxite sands of various particle sizes, the finest sand having a mean particle size of less than 1 mm and the coarsest sand having a mean particle size of less than 10 mm;

silica fume, 90% of the particles of which have a diameter of less than 1 µm, the mean diameter being about 0.5 µm;

a defoamer;

a water-reducing super plasticizer;

optionally, fibers; and water, characterized in that the silica fume represents at most 15 parts by weight per 100 parts by weight of cement, in that it further includes ultrafine calcium carbonate particles having a specific surface area of 10 m$^2$/g or more, preferably of 15 m$^2$/g or more and better still around 20 m$^2$/g, and a form factor FF of 0.3 or more, preferably of 0.4 or more, and also characterized in that the cements, sands, ultrafine calcium carbonate particles and the silica fume have a particle size distribution such that there are at least three and at most five different particle size classes, the ratio of the mean diameter of one particle size class to that of the class immediately above being about 10.

The lightness of color of the concrete according to the invention depends on the proportion of ultrafine calcium carbonate particles relative to the silica fume in the concrete. The ratio, by weight, of the amount of ultrafine calcium carbonate particles in the concrete to the amount of silica fume may vary from 1/99 to 99/1 and preferably from 50/50 to 99/1.

If it is desired to have an ultrahigh-performance concrete of very light color, or even almost white, it is possible to completely replace the silica fume with ultrafine calcium carbonate particles.

The subject of the invention is therefore also an ultrahigh-performance self-compacting concrete in which the silica fume has been completely replaced with ultrafine calcium carbonate particles. Such a concrete comprises:

a cement;

a mixture of calcined bauxite sands of various particle sizes, the finest sand having a mean particle size of less than 1 mm and the coarsest sand having a mean particle size of less than 10 mm;

ultrafine calcium carbonate particles having a specific surface area of 10 m²/g or more, preferably of 15 m²/g or more and better still around 20 m²/g, and a form factor FF of 0.3 or more, preferably of 0.4 or more;

a defoamer;

a water-reducing super plasticizer;

optionally, fibers; and water, the cements, sands and ultrafine calcium carbonate particles having a particle size distribution such that there are at least three and at most five different particle size classes, the ratio of the mean diameter of one particle size class to that of the class immediately above being about 10.

As ultrafine calcium carbonate particles, it is preferred to use ultrafine calcium carbonate particles that are crystallized in the form of small cubes. This form helps to make the concrete very fluid in the fresh state, it being possible for these calcium carbonate particles to be easily inserted between the cement particles and the sand particles.

The cement used in the present invention is preferably a white cement. It may be chosen from cements of the Portland CEM 1 type, having complementary characteristics, such as "Prise Mer or PM" cements or better still "sulfate-resistant Prise Mer or PM-ES" cements, or blends thereof.

The term "white cement" is understood, for the purpose of the present invention, to mean a cement of essentially white color, the composition of which comprises very pure raw materials, such as lime and kaolin, and which is essentially free of any traces of iron oxide.

As an example of white cement that can be used in the concrete according to the invention, mention may be made of the white cement CPA 52,5 from Teil sold by Lafarge.

The expression "mixture of calcined bauxite sands" is understood, for the purpose of the present invention, to mean not only a mixture of calcined bauxite sands of various particles sizes, but also a mixture comprising calcined bauxite sand with aggregates of very high strength and hardness such as, especially, aggregates of corundum, emery or metallurgical residues, such as silicon carbide, or else with another type of sand, and preferably a calcareous sand as it has a light color.

In the present invention, it is preferred to use a mixture of two or three calcined bauxite sands of different particles sizes.

According to one particular embodiment of the invention, this mixture of sands is formed by:

a sand of mean particle size less than 1 mm, which includes 20% of particles smaller in size than 80 microns;

a sand of particle size between 3 and 7 mm; and optionally, a sand of particle size between 1 and 3 mm.

The sand of smallest particle size may be completely or partly replaced with:

cement, mineral additions such as ground slag, fly ash or calcined bauxite filler, the mean diameter of which is close to that of cement, in respect of the 20% fraction of fines smaller in size than 80 μm; and sand of particle size greater than 1 mm (for example 3 to 7 mm), in respect of the other fraction.

When the concrete according to the invention includes silica fume (blended with ultrafine calcium carbonate particles), the silica fume may be densified or undensified, i.e. it has a density between 200 and 600 kg/m³. This silica fume, once dispersed in the concrete, must comprise at least 40% of particles smaller in size than one micron, the size of the remaining particles being less than 20 μm.

To avoid the inclusion of air bubbles, which would reduce the strength of the concrete, a defoamer conventionally used for oil drilling, that is to say in applications requiring very precise control of the density of the poured material, is employed. These defoamers are also called "defoamers and deaerators admixtures". They are in dry form or in liquid form. As examples of defoamers that can be used in the concrete according to the invention, mention may in particular be made of dodecyl alcohol/propylene glycol mixtures, dibutyl phthalates, dibutyl phosphates, silicone polymers, such as polydimethylsiloxane, and modified silicates.

According to one particular embodiment of the invention, a silicate treated with a polymerized glycol, sold by Troy Chemical Corporation under the brand name TROYKYD®D126 is used as defoamer.

As water-reducing superplasticizer, it is preferred to use a water-reducing superplasticizer of the modified polycarboxylic ether type, such as GLENIUM® 51 sold by MBT France, or a water-reducing super plasticizer of the synthetic vinyl acrylic copolymer type such as the superplasticizer VISCOCRETE 5400F sold by Sika France, or else a water-reducing superplasticizer in the form of an aqueous solution of modified polycarboxylates such as VISCOCRETE 20HE, also sold by Sika France.

Complementarily, when the overall alkali content in the concrete is too high (if the nature of the aggregates or else the amount of silica fume is greater than 10% of the weight of cement), it is possible to reduce said amount, for example by neutralizing the alkalis that are contained in the plasticizers. The neutralization of the plasticizers may be chosen to be based on calcium rather than on sodium.

To increase the properties of the concrete according to the invention, in certain constructions, fibers are incorporated into the concrete. These fibers may be synthetic, organic, mineral or metal fibers. In particular, they may be chosen from polyethylene, polypropylene, polyamide and polyvinyl alcohol homopolymer or copolymer fibers, carbon fibers, Kevlar® (PPTA, poly-paraphenylene terephthalamide) fibers and steel fibers.

These fibers may be of any shape. However, to obtain good workability of the concrete, it is preferred to use straight fibers.

These fibers have a diameter of between 0.1 and 1.0 mm, preferably between 0.2 and 0.5 mm, and more preferably still around 0.3 mm, and a length of between 5 and 30 mm, preferably between 10 and 25 mm and even more preferably around 10 and 20 mm.

When fibers are introduced, the granular matrix is modified. This is because, since the fibers have to be coated, it is therefore necessary for the amount of fines, that is to say particles having a size of less than 0.1 mm, to increase. The amount of ultrafine calcium carbonate particles and, where appropriate, of silica fume particles, cement, sand particles of smaller particle size and/or of mineral additions is therefore greater than that of a concrete with no fibers. Furthermore, trials have shown that better results are obtained in terms of tensile strength with a fiber content representing about 2 to 3% of the volume, i.e. about 15 to 24 parts by weight relative to the total weight of the concrete.

Thus, according to one advantageous embodiment of the invention, the concrete comprises, in parts by weight:

100 of cement;

50 to 200 of mixtures of calcined bauxite sands, of various particle sizes, the finest sand having a mean particle size of less than 1 mm and the coarsest sand having a mean particle size of less than 10 mm;

5 to 25 of ultrafine calcium carbonate and silica fume particles, the silica fume representing at most 15% by weight;

0.1 to 10 of defoamer;

0.1 to 10 of water-reducing super plasticizer;

15 to 24 of fibers; and 10 to 30 of water.

The ratio, by weight, of the amount of ultrafine calcium carbonate particles in the concrete to the amount of silica fume may vary from 1/99 to 99/1 and preferably from 50/50 to 99/1.

If it is desired to obtain a light-colored concrete, while still maintaining a high characteristic 28-day compressive strength, the best results are obtained with a concrete according to the invention completely free of silica fume, which comprises, in parts by weight:

100 of cement;

80 to 150, preferably 100 to 125, of mixtures of calcined bauxite sands, of various particle sizes, the finest sand having a mean particle size of less than 1 mm and the coarsest sand having a mean particle size of less than 10 mm;

10 to 20, preferably 13 to 17, of ultrafine calcium carbonate particles;

0.2 to 5, preferably 0.5 to 0.7, of defoamer;

5 to 7 of water-reducing super plasticizer;

17 to 20 of fibers; and 10 to 20, preferably 16 to 20, of water.

Moreover, it is possible to add 0.5 to 3 parts, preferably 0.5 to 2 parts and even more preferably 1 part of calcium oxide or calcium sulfate to the concrete composition according to the invention. The calcium oxide or calcium sulfate is added in pulverulent or micronized form and must make it possible to compensate for the endogenous shrinkage inherent in formulations based on hydraulic binders associated with very small amounts of water. It is also possible to use calcined bauxite fillers (the mean diameter of which is less than 80 µm) as a partial substitute for the cement, ultrafine calcium carbonate particles and, where appropriate, silica fume.

In addition, it is also possible to add from $0.3 \times 10^{-3}$ to $1.15 \times 10^{-3}$ parts by weight with respect to the total weight of the concrete, excluding reinforcing fibers, of polypropylene fibers, to the concrete composition according to the invention in order to improve the fire resistance of the concrete according to the invention.

The amounts of the various constituents of the concrete can be adjusted by those skilled in the art according to the use and the desired properties of the concrete.

The higher the proportion of ultrafine calcium carbonate particles in the concrete relative to the silica fume, the lighter the color of this concrete. Thus, in the case of complete substitution of the silica fume with ultrafine limestone particles, and if a white cement is used, an almost white concrete is therefore obtained. However, if it is not desired to obtain a very light concrete of truly white color, it is unnecessary to completely substitute the silica fume with ultrafine limestone particles. In this case, the concrete has a characteristic 28-day compressive strength higher than that of a concrete containing no silica fume.

The subject of the invention is also a method of preparing the concrete.

According to a first method of implementing the invention, all the constituents of the concrete according to the invention are introduced into a mixer, which are then mixed, and what is obtained is a concrete ready to mold or cast and having a very good workability.

In another method of implementation, all the dry granular materials, that is to say the cement, the sands, the ultrafine limestone particles and, where appropriate the silica fume, and optionally the super plasticizer and the defoamer are first of all blended, then this preblend is introduced into a mixer, and then water, the super plasticizer and the defoamer, if these are in liquid form, and the fibers, if these are required, are added.

Preferably, the powder blend is firstly prepared and then, at the time of use, the powders are mixed with the desired amounts of fiber and water, optionally water-reducing super plasticizer and defoamer if these are in liquid form. Thus, advantageously, bags or any other type of packaging (for example "big bags") of dry preblended product ready to use are prepared, which are easily preserved and stored, given that they have a very low water content. At the moment of use, all that is therefore required is to pour this ready-to-use preblended product into a mixer together with the desired amounts of fiber, water and, optionally, water-reducing super plasticizer. After mixing, for example for 4 to 16 minutes, the concrete according to the invention obtained may be molded without any difficulty, given its very high spreading performance.

To carry out the molding, it is possible to use conventional molds, made of wood, metal, etc., or heated molds whose sole purpose is to reduce the setting time and to achieve a more rapid rise in strength. The concrete according to the invention in no way needs to undergo a heat treatment to achieve the required performance. Of course, a heat treatment could be envisaged in order to further improve the performance, but this would incur an additional cost.

The present invention also relates to dry-preblended products ready to use.

The concrete according to the invention may be used in all fields of application for reinforced or nonreinforced concrete.

More particularly, owing to the fact that this concrete is self-compacting, it may be poured on site in order to produce posts, beams, girders, floors, etc. It may also be used in all prefabrication applications. Owing to its cohesion and viscosity characteristics, it may be used for formwork containing inserts. It may also be used for producing keystones between structural elements. It may also be used for the production of slabs, engineering structures, prestressed components or composites.

Moreover, its high compressive strength makes it possible to reduce the design of constructions employing it. Thus, the concrete according to the invention would be particularly useful for example for all the components, shafts, pipes, containers, etc. used for drains. It also has a very low friction coefficient, which is not modified over the course of time, making it very appropriate for transporting materials that conventionally corrode concrete.

Finally, the concretes according to the invention that have a reduced, or even zero, silica fume content may be used in all architectonic applications, because of their light color, which is particularly desirable for such applications, and because of their good mechanical properties, especially a high compressive strength.

The present invention will be explained in greater detail by means of the single nonlimiting example that follows. The amounts are in parts by weight, unless otherwise indicated.

EXAMPLE

A concrete formulation according to the invention was prepared with the composition given in Table 1.

Raw Materials:
- the cement used was a white cement, namely CPA 52,5 blanc from Teil sold by Lafarge;
- the mixture of bauxite sands used was a mixture of bauxite sand with a particle size of less than 1 mm and a bauxite sand with a particle size of between 3 and 7 mm;
- the ultrafine calcium carbonate particles were ultrafine additions of synthetic calcium carbonate crystallized in the form of cubes, and sold by SOLVAY under the brand name SOCAL®31;
- the fibers used were straight steel fibers 0.3 mm in diameter and 20 mm in length;
- the water-reducing super plasticizer was sold by Sika France under the brand name VISCOCRETE 5400 F;
- the defoamer used was a defoamer sold by Troy under the brand name TROYKYD®D126; and
- the mixing water was present in an amount such that the W/C (water/cement) ratio was fixed at 0.225.

TABLE 1

| RAW MATERIALS | AMOUNT |
| --- | --- |
| Cement | 1015 |
| Ultrafine calcium carbonate particles | 152 |
| Calcined bauxite sand with a mean particle size of less than 1 mm | 775 |
| Calcined bauxite sand with a particle size of between 3 and 7 mm | 373 |
| Metal fibers | 197 |
| Water-reducing super plasticizer | 63.8 |
| Defoamer | 6 |
| Water | 184 |

Cylindrical test pieces measuring 11×22 cm were prepared from this formulation, on which standardized tests were carried out in order to measure the 28-day compressive strength according to the NFP 18406 standard.

A very light colored concrete was obtained, having a mean compressive strength of at least 165 MPa and a characteristic 28-day compressive strength of at least 150 MPa.

The invention claimed is:

1. A self-compacting concrete, having a characteristic 28-day compressive strength of at least 150 MPa, said compressive strength being measured for a concrete preserved and maintained at 20° C. without cure or heat treatment, comprising:
   - a cement;
   - a mixture of calcined bauxite sands of various particle sizes, the finest sand having a mean particle size of less than 1 mm and the coarsest sand having a mean particle size of less than 10 mm;
   - ultrafine calcium carbonate particles having a specific surface area of 10 m$^2$/g or more, and a form factor FF of 0.3 or more;
   - a defoamer;
   - a water-reducing super plasticizer;
   - optionally, fibers; and
   - water, the cements, sands, ultrafine calcium carbonate particles having a particle size distribution such that there are at least three and at most five different particle size classes, the ratio of the mean diameter of one particle size class to that of the class immediately above being about 10.

2. The concrete according to claim 1, wherein said concrete comprises, in parts by weight:
   - 100 of cement;
   - 50 to 200 of mixtures of calcined bauxite sands, of various particle sizes, the finest sand having a mean particle size of less than 1 mm and the coarsest sand having a mean particle size of less than 10 mm;
   - 5 to 25 of ultrafine calcium carbonate and silica fume particles, the silica fume representing at most 15 parts by weight;
   - 0.1 to 10 of defoamer;
   - 0.1 to 10 of water-reducing super plasticizer;
   - 15 to 24 of fibers; and
   - 10 to 30 of water.

3. The concrete according to claim 2, wherein said concrete comprises, in parts by weight:
   - 100 of cement;
   - 80 to 150 of mixtures of calcined bauxite sands, of various particle sizes, the finest sand having a mean particle size of less than 1 mm and the coarsest sand having a mean particle size of less than 10 mm;
   - 10 to 20 of ultrafine calcium carbonate particles;
   - 0.2 to 5 of defoamer;
   - 5 to 7 of water-reducing super plasticizer;
   - 17 to 20 of fibers; and
   - 10 to 20 of water.

4. The concrete according to claim 1, wherein the ultrafine calcium carbonate particles are ultrafine additions of calcium carbonate crystallized in the form of cubes.

5. The concrete according to claim 1, wherein the cement is a cement of essentially white color.

6. The concrete according to claim 1, wherein the mixture of calcined bauxite sands is formed by:
   - a sand of mean particle size less than 1 mm, which includes 20% of fines smaller in size than 80 microns;
   - a sand of particle size between 3 and 7 mm; and
   - optionally, a sand of particle size between 1 and 3 mm, the sand of smaller particle size being optionally completely or partly replaced with:

cement, mineral additions including ground slag, fly ash or calcined bauxite filler, the mean diameter of which is less than 80 μm, in respect of the 20% fraction of fines smaller in size than 80 μm; and sand of particle size greater than 1 mm, in respect of the other fraction.

7. The concrete according to claim 1, wherein the fibers are selected from the group consisting of metal, synthetic, organic and mineral fibers and mixtures thereof.

8. A method of preparing the fiber concrete as claimed in claim 1, wherein all the constituents of the concrete are mixed together until a concrete of an effective fluidity is obtained in that the dry granular constituents, including the cement, the sands, the ultrafine calcium carbonate particles, the silica fume and optionally the super plasticizer and the defoamer, are first blended together, then in that the water and optionally the super plasticizer and the defoamer, if these are in liquid form, and optionally the fibers are added to this blend and in that these are all mixed until a concrete having an effective fluidity is obtained.

9. A concrete dry ready-mix, wherein, after the addition of water, optionally fibers, and water-reducing superplasticizer and defoamer, if these are in liquid form, said concrete dry-ready mix is capable of resulting in a concrete as claimed in claim 1.

10. The concrete according to claim 1, wherein said ultrafine calcium carbonate particles have a specific surface area of 15 $m^2/g$ or more.

11. The concrete according to claim 1, wherein said ultrafine calcium carbonate particles have a specific surface area of 20 $m^2/g$ or more.

12. The concrete according to claim 1, wherein said ultrafine calcium carbonate particles have a form factor FF of 0.4.

13. The concrete according to claim 3, wherein said concrete comprises, in parts by weight, 100 to 125 of mixtures of calcined bauxite sands, of various particle sizes, the finest sand having a mean particle size of less than 1 mm and the coarsest sand having a mean particle size of less than 10 mm.

14. The concrete according to claim 3, wherein said concrete comprises, in parts by weight, 13 to 17 of ultrafine calcium carbonate particles.

15. The concrete according to claim 3, wherein said concrete comprises, in parts by weight, 0.5 to 0.7 of defoamer.

16. The concrete according to claim 3, wherein said concrete comprises, in parts by weight, 16 to 20 of water.

17. The concrete according to claim 7, wherein the fibers are selected from the group consisting of polyethylene, polypropylene, polyamide and polyvinyl alcohol homopolymer or copolymer fibers, carbon fibers, PPTA (poly-paraphenylene terephthalamide) fibers and steel fibers.

* * * * *